United States Patent [19]

Yamauchi et al.

[11] Patent Number: 4,834,771

[45] Date of Patent: May 30, 1989

[54] AQUEOUS LIQUID DYE COMPOSITION OF C.I. REACTIVE BLUE ZI AND CAPROLACTAM OR N-METHYL PYRROLIDONE

[75] Inventors: Noriaki Yamauchi; Shinnei Ikeou, both of Hirakata; Kunihiko Imada, Sakai, all of Japan

[73] Assignee: Sumitomo Chemical Company, Limited, Osaka, Japan

[21] Appl. No.: 836,719

[22] Filed: Mar. 6, 1986

[51] Int. Cl.⁴ .................. C06P 1/64; C09B 67/24
[52] U.S. Cl. ........................... 8/527; 8/549; 8/564; 8/574; 8/661
[58] Field of Search .............. 8/549, 576, 527, 661, 8/564, 574

[56] References Cited

U.S. PATENT DOCUMENTS

| | | | |
|---|---|---|---|
| 4,331,442 | 5/1982 | Uhlig et al. | 8/564 |
| 4,443,224 | 4/1984 | Opitz | 8/527 |
| 4,448,583 | 5/1984 | Corso | 8/527 |
| 4,588,411 | 5/1986 | Scheibli et al. | 8/528 |
| 4,602,915 | 7/1986 | Wolff et al. | 8/527 |

FOREIGN PATENT DOCUMENTS 2529658  1/1977  Fed. Rep. of Germany .
1060063  2/1967  United Kingdom .

*Primary Examiner*—A. Lionel Clingman
*Attorney, Agent, or Firm*—Stevens, Davis, Miller & Mosher

[57] ABSTRACT

An aqueous liquid dye composition comprising 10 to 50% by weight of a fiber-reactive copper phthalocyanine dye represented by the following formula (I) in the form of a free acid,

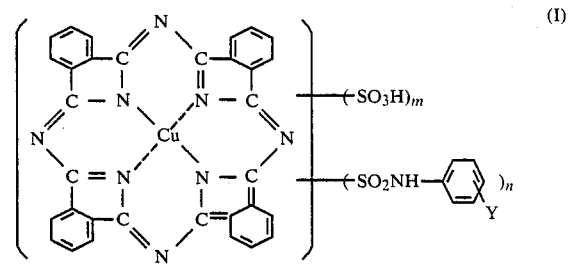

wherein Y is a group of $-SO_2CH=CH_2$ or $-SO_2CH_2CH_2Z$, in which Z is a splittable group by the action of an alkali, and m and n are independently a number of 1 to 3, provided that they satisfy the following formula, $2 < m+n \leq 4$, 0.1 to 20% by weight of at least one cyclic imide selected from $\epsilon$-caprolactam and N-methylpyrrolidones and the balance of water, which is chemically and physically stable, even when stored for a long period of time at ambient temperature or stored at a relatively high temperature such as 50° to 80° C.

1 Claim, No Drawings

AQUEOUS LIQUID DYE COMPOSITION OF C.I. REACTIVE BLUE ZI AND CAPROLACTAM OR N-METHYL PYRROLIDONE

The present invention relates to an aqueous liquid composition of a fiber-reactive dye with an excellent storage stability, and a method for dyeing or printing fiber materials using the same.

More specifically, the present invention relates to an aqueous liquid composition of a fiber-reactive copper phthalocyanine dye represented by the following formula (I) in the form of a free acid,

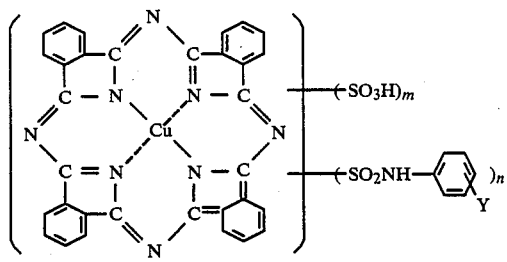

wherein Y is a group of $-SO_2CH=CH_2$ or $-SO_2CH_2CH_2Z$, in which Z is a splittable group by the action of an alkali, and m and n are independently a number of 1 to 3, provided that they satisfy the following formula, $2<m+n\leq4$, and a method for dyeing or printing fiber materials in a brilliant blue color using the same.

There are many kinds of fiber-reactive dyes such as vinylsulfone, monochlorotriazine, monofluorotriazine, dichloroquinoxaline, dichlorotriazine, difluoropyrimidine, difluorochloropyrimidine, trichloropyrimidine and other type reactive dyes, and these reactive dyes have been formed frequently into an aqueous liquid dye composition because of well-known reasons, for example, as disclosed in Published Un-examined Japanese Patent Application No. 136314/1975.

In recent years, the energy-saving and labor-saving are the greatest object to be accomplished even in a dye house. For example, on dyeing fiber materials, reactive dyes in the form of powder require a dissolution procedure, which is not only troublesome from viewpoint of the operation, but also disadvantageous from viewpoint of the energy-saving due to an irrationality such that it is necessary to dissolve the dye first in hot water, and then cool the solution to ambient temperature.

For these reasons, the fiber-reactive dyes have been formed frequently into their liquid compositions.

The fiber-reactive copper phthalocyanine dyes of the formula (I), which has been widespreadly employed for dyeing or printing fiber materials because of its characteristic features, may be formed into an aqueous composition in a conventional manner. However, when stored for a long period of time or at a relatively high temperature, the liquid dye composition formed in such a manner is readily subject to both chemical and physical changes, so that on dyeing or printing fiber materials after the storage, the liquid dye composition may give dyed or printed products of a color different from that obtainable immediately after preparation of the liquid composition, causing serious troubles in a dye house. Particularly when stored at a temperature higher than 30° C. for a long period of time, the liquid composition of the copper phthalocyanine dye (I) may change into a solid, which cannot be put into practical use for the dyeing or printing of fiber materials.

The present inventors have undertaken extensive studies to improve such drawbacks in the aqueous liquid composition of the copper phthalocyanine dye (I), and found the fact that the problem can be solved by incorporating a specific cyclic imide into the aqueous liquid composition of the copper phthalocyanine dye (I).

The present invention provides an aqueous liquid dye composition comprising 10 to 50% by weight of the fiber-reactive copper phthalocyanine dye of the formula (I), 0.1 to 20% by weight of at least one cyclic imide selected from ε-caprolactam and N-methylpyrrolidones and the balance of water, and a method for dyeing or printing fiber materials using the aqueous liquid dye composition.

The copper phthalocyanine dye of the formula (I) can be produced in a manner known per se.

In the preparation of the aqueous liquid dye composition, the copper phthalocyanine dye (I) may be in the dye-containing reaction mixture as such obtainable in the conventional manner, or in a wet cake obtainable by salting out the reaction mixture, followed by filtration, or in a powder obtainable by drying the wet cake, followed by pulverization. When the dye-containing reaction mixture having a water content higher than that defined above is used, the dye content can be controlled by subjecting the reaction mixture to concentration (for example, evaporation of a part of water in vacuo). Alternatively, a part of the dye-containing reaction mixture can be dried up to obtain a dye powder, and then the powder can be mixed with the remaining dye-containing reaction mixture. While, the wet cake or powder is dissolved in water to form a clear dye solution.

When inorganic salts such as sodium sulfate are contained in a large amount in the dye-containing reaction mixture or the clear dye solution, it is preferred to remove the salts in a conventional manner, for example, by cooling the reaction mixture or the clear solution to precipitate the salts, which are then separated by filtration. The content of inorganic salts is preferably 3% by weight or less, more preferably 1% by weight or less.

It is also preferred to adjust the pH of the dye-containing reaction mixture or the clear dye solution within a range of from 3 to 7, preferably from 4 to 6, more preferably from 4.5 to 5.5

A dye content in the aqueous liquid dye composition of the present invention ranges from 10 to 50% by weight, preferably from 20 to 40% by weight based on the weight of the aqueous liquid dye composition.

The cyclic imide usable in the present invention is at least one member selected from ε-caprolactam and N-methylpyrrolidones which are commercially available. The content of the cyclic imide ranges from 0.1 to 20% by weight, preferably from 2 to 10% by weight based on the weight of the present aqueous liquid dye composition.

The aqueous liquid dye composition of the present invention can be prepared by adding and dissolving the cyclic imide into the dye-containing reaction mixture or the clear dye solution described above.

The thus prepared liquid dye composition may additionally contain conventional additives and/or buffers.

The additives are those inert to the copper phthalocyanine dye (I), and include, for example, surfactants, dyeing auxiliaries, hydrotropic agents, deforming agents, antifreezing agents, antiseptics and the like.

The buffers usable are those capable of keeping the pH of the present aqueous liquid dye composition within a range of from 3 to 7, preferably from 4 to 6, and include, for example, potassium or sodium dihydrogenphosphate, dipotassium or disodium hydrogenphosphate, sodium acetate and the like.

The aqueous liquid dye composition prepared in accordance with the present invention can be stored for a long period of time at ambient temperature, or for several weeks at a relatively high temperature of from 50° to 80° C. For example, the present aqueous liquid dye composition can give dyed or printed products of a color depth and a color shade similar to those of products obtainable using the aqueous liquid dye composition immediately after the preparation, even when stored for 12 months at ambient temperature, or for 4 weeks at 60° C.

The aqueous liquid dye composition of the present invention is useful for dyeing or printing natural or synthetic fiber materials such as paper, cellulose fibers, polyamide fibers and wool. The dyeing and printing can be carried out in a conventional manner usually applied for fiber-reactive dyes of this kind.

In the dyeing of fiber materials, for example, an exhaustion dyeing can be carried out at a relatively low temperature (for example, 50° to 80° C.) using a dye bath containing an acid binding agent such as sodium carbonate, trisodium phosphate, sodium hydroxide and the like, and an inorganic salt such as sodium sulfate, sodium chloride and the like. A conventional printing can be also applied to obtain favorable results. For example, the printing can be carried out by applying a printing paste containing an acid binding agent to cloth, drying the cloth and then treating it at a relatively high temperature (for example, 100° to 200° C.). The printing paste may further contain a hydrotropic agent such as urea, a reduction inhibitor such as sodium metanitrobenzenesulfonate, and the like.

The present invention is illustrated in more detail with reference to the following Examples, which are only illustrative, and not intended to limit the scope of the present invention. In Examples, parts and % are by weight.

EXAMPLE 1

$\epsilon$-Caprolactam (30 parts) was added and dissolved in a clear aqueous solution of a copper phthalocyanine dye of the formula (I), wherein Y is $-SO_2CH_2CH_2OSO_3H$ located at p-position, m is 2.6 and n is 1.3 (970 parts) having a dye content of 32% and a pH value of 5.0 to prepare an aqueous liquid dye composition having a dye content of 31% and a pH value of 5.03.

Using the aqueous liquid dye composition (4 parts), a printing paste (100 parts) was prepared in a conventional manner, and then in a manner known for the reactive dye of this kind, cotton was printed with the paste, followed by fixation treatment, to obtain a printed product of a brilliant blue color.

On the other hand, the aqueous liquid dye composition was stored in a closed vessel for 12 months at ambient temperature, and for 4 weeks at 60° C., respectively. Then, no change in the liquid state was observed. Using this liquid dye composition, printing was carried out in the same manner as above to obtain a printed product. The color depth and color shade thereof were not different from those of the above.

EXAMPLE 2

$\epsilon$-Caprolactam (50 parts) was added and dissolved in a clear solution of a copper phthalocyanine dye of the formula (I), wherein Y is $-SO_2CH_2CH_2OSO_3H$ located at p-position, m is 2.5, and n is 1.4, (950 parts) having a dye congent of 32% and a pH value of 4.88 to obtain an aqueous liquid dye composition having a dye content of 30.4% and a pH value of 4.92.

Using the aqueous liquid dye composition (4 parts), a printing paste (100 parts) was prepared in a conventional manner, and then in a manner known for a reactive dye of this kind, cotton was printed with the paste, followed by fixation treatment, to obtain a printed product of a brilliant blue color.

On the other hand, the aqueous liquid dye composition was stored in a closed vessel for 12 months at ambient temperature, and for 1 week at 80° C., respectively. Then, no change in the liquid state was observed. Using this liquid dye composition, printing was carried out in the same manner as above to obtain a printed product. The color depth and color shade thereof were not different from those of the above.

EXAMPLE 3

N-Methyl-2-pyrrolidone (50 parts) was added and dissolved in a clear aqueous solution of a copper phthalocyanine dye of the formula (I), wherein Y is $-SO_2CH_2CH_2OSO_3H$ located at m-position, m is 2.3, and n is 1.5, (950 parts) having a dye content of 32% and a pH value of 5.0 to obtain an aqueous liquid dye composition, having a dye content of 30.4% and a pH value of 4.9.

Using the aqueous liquid dye composition (5 parts), a printing paste (100 parts) was prepared in a conventional manner, and then in a manner known for a reactive dye of this kind, cotton was printed with the paste, followed by fixation treatment, to obtain a printed product of a brilliant blue color.

On the other hand, the liquid dye composition was stored in a closed vessel for 12 months at ambient temperature, and for 1 week at 80° C., respectively. Then, no change in the liquid state was observed. Using this liquid dye composition, printing was carried out in the same manner as above to obtain a printed product. The color depth and color shade thereof were not different from those of the above.

COMPARATIVE EXAMPLE 1

Using a clear aqueous solution of the same dye as used in Example 1 (4 parts) having a dye content of 31% and a pH value of 5.0, a printing paste (100 parts) was prepared in a conventional manner. Then, in a manner known for a reactive dye of this kind, cotton was printed with the paste, followed by fixation treatment, to obtain a printed product of a brilliant blue color.

On the other hand, the same clear aqueous solution as above was stored in a closed vessel for 12 months at ambient temperature. Then, the solution turned to gel. Using this gel, printing was carried out in the same manner as above to obtain a printed product of a yellowish dark blue color.

COMPARATIVE EXAMPLE 2

Using a clear aqueous solution of the same dye as used in Example 2 (4 parts) having a dye content of 30.4% and a pH value of 4.88, a printing paste (100 parts) was prepared in a conventional manner. Then, in a manner known for a reactive dye of this kind, cotton was printed with the paste, followed by fixation treatment, to obtain a printed product of a brilliant blue color.

On the other hand, the same aqueous solution as above was stored in a closed vessel for 1 week at 80° C. Then, the solution turned to a solid, which couldn't be used for the printing.

COMPARATIVE EXAMPLE 3

Using a clear solution of the same dye as used in Example 3 (5 parts) having a dye content of 30.4% and a pH value of 5.0, a printing paste (100 parts) was prepared in a conventional manner. Then, in a manner known for a reactive dye of this kind, cotton was printed with the paste, followed by fixation treatment, to obtain a printed product of a brilliant blue color.

On the other hand, the same clear solution as above was stored in a closed vessel for 12 months at ambient temperature. Then, the solution turned to gel. Using this gel, printing was carried out in the same manner as above to obtain a printed product of a yellowish dark blue color. While, the clear solution was stored in a closed vessel for 1 week at 80° C. Then, the solution turned to a solid, which couldn't be used for the printing.

What is claimed is:

1. A method for enhancing storage stability when storing an aqueous liquid dye composition, said composition being stable for several weeks even when stored at 50°-80° C., which comprises preparing a clear aqueous solution of a fiber-reactive copper phthalocyanine dye represented by the following formula (I) in the form of a free acid,

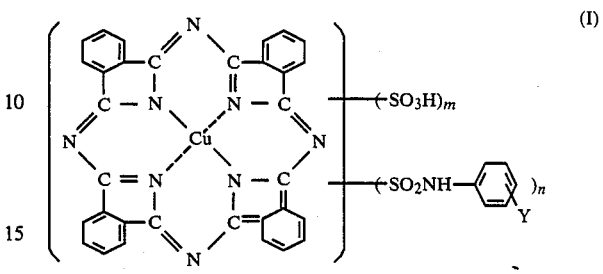

where Y is a group of $-SO_2CH=CH_2$ or $-SO_2CH_2CH_2Z$, in which Z is a splittable group by the action of an alkali, and m and n are independently a number of 1 to 3, provided that they satisfy the following formula, $2 < m+n \leq 4$, and dissolving into the aqueous solution at least one cyclic imide selected from ε-caprolactam and N-methylpyrrolidones to form an aqueous liquid dye composition having a dye content of 10 to 50% by weight and a cyclic imide content of 2 to 10% by weight, and storing the aqueous liquid dye composition in a closed vessel.

* * * * *